(12) United States Patent
Stueckler et al.

(10) Patent No.: US 10,955,027 B2
(45) Date of Patent: Mar. 23, 2021

(54) METHOD FOR PRODUCING CONTINUOUS METAL STRIPS OF ANY WIDTH

(71) Applicant: Berndorf Band GmbH, Berndorf (AT)

(72) Inventors: Thomas Stueckler, Ternitz (AT); Christian Wahl, Berndorf (AT)

(73) Assignee: Berndorf Band GmbH, Berndorf (AT)

( * ) Notice: Subject to any disclaimer, the term of this patent is extended or adjusted under 35 U.S.C. 154(b) by 347 days.

(21) Appl. No.: 16/073,880

(22) PCT Filed: Feb. 23, 2017

(86) PCT No.: PCT/AT2017/060042
§ 371 (c)(1),
(2) Date: Jul. 30, 2018

(87) PCT Pub. No.: WO2017/143376
PCT Pub. Date: Aug. 31, 2017

(65) Prior Publication Data
US 2019/0040934 A1  Feb. 7, 2019

(30) Foreign Application Priority Data
Feb. 23, 2016  (AT) ............................... A 50125/2016

(51) Int. Cl.
*F16G 3/10* (2006.01)
*F16G 1/20* (2006.01)
*B21D 53/14* (2006.01)

(52) U.S. Cl.
CPC .............. *F16G 3/10* (2013.01); *B21D 53/14* (2013.01); *F16G 1/20* (2013.01)

(58) Field of Classification Search
CPC ... F16G 5/16; F16G 3/10; B21D 53/14; Y10T 24/1664; B21C 37/0815

USPC ......................................................... 474/242
See application file for complete search history.

(56) References Cited

U.S. PATENT DOCUMENTS

| | | | | |
|---|---|---|---|---|
| 194,993 | A | * | 9/1877 | Crossley .................. F16G 3/10 474/254 |
| 1,127,549 | A | * | 2/1915 | Usina ..................... B29C 66/43 428/60 |
| 1,203,189 | A | * | 10/1916 | Fisher ....................... F16G 3/10 474/254 |
| 1,411,602 | A | * | 4/1922 | Barnard .................... F16G 3/10 474/254 |

(Continued)

FOREIGN PATENT DOCUMENTS

| CN | 101365841 A | 2/2009 |
|---|---|---|
| CN | 101374634 B | 9/2011 |

(Continued)

OTHER PUBLICATIONS

International Search Report of PCT/AT2017/060042, dated Jul. 11, 2017.

*Primary Examiner* — Henry Y Liu
(74) *Attorney, Agent, or Firm* — Collard & Roe, P.C.

(57) ABSTRACT

Disclosed is an endless metal belt (101, 102) which has a length/circumference (l1) and a width (b1) and which is produced by welding a number of individual metal belt parts (2). A rolling direction (3) of the individual metal belt parts (2) and the weld seams (4) extend transversely to the length/circumference (l1) of the metal belt (101, 102). Also disclosed is a method for producing an endless metal belt (101, 102) of said type.

13 Claims, 3 Drawing Sheets

(56) References Cited

U.S. PATENT DOCUMENTS

Figure 1:
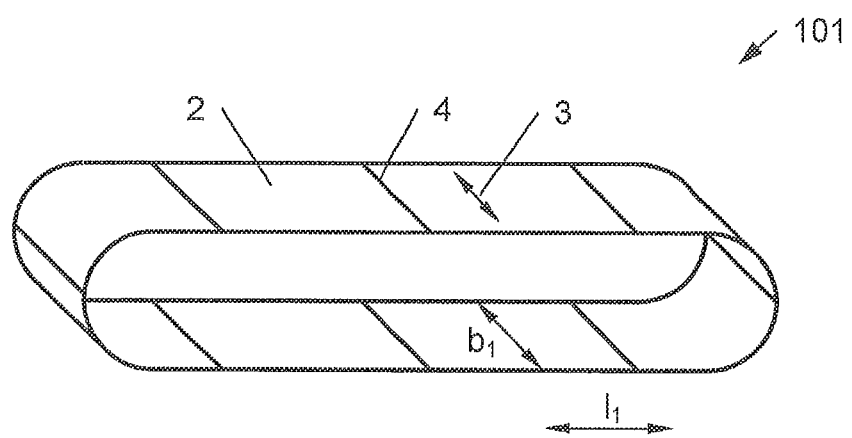

| | | | | |
|---|---|---|---|---|
| 1,447,243 | A * | 3/1923 | George | F16G 1/24 474/247 |
| 2,932,340 | A * | 4/1960 | Poeschl | B32B 27/00 474/254 |
| 3,007,826 | A * | 11/1961 | Brooksbank | F16G 1/02 474/254 |
| 4,328,411 | A * | 5/1982 | Haller | B23K 15/08 219/121.18 |
| 4,328,726 | A * | 5/1982 | Pearl | B26D 5/005 83/39 |
| 4,356,377 | A * | 10/1982 | Norton | H02K 15/026 219/121.17 |
| 4,537,810 | A * | 8/1985 | Held | B30B 5/04 428/156 |
| 4,619,634 | A * | 10/1986 | Nakawaki | F16G 5/16 474/201 |
| 6,090,004 | A * | 7/2000 | Kanehara | F16G 5/163 474/201 |
| 6,217,471 | B1 * | 4/2001 | Brandsma | B21D 53/14 474/201 |
| 6,217,472 | B1 * | 4/2001 | Fujioka | F16G 5/16 474/201 |
| 6,273,837 | B1 * | 8/2001 | Yoshida | F16G 5/16 474/201 |
| 6,517,458 | B2 * | 2/2003 | Kanehara | F16G 5/16 474/201 |
| 6,626,782 | B1 * | 9/2003 | Ohsono | B21D 53/14 474/201 |
| 6,679,798 | B1 * | 1/2004 | Takagi | F16G 5/16 474/242 |
| 6,708,383 | B2 * | 3/2004 | Arikawa | F16G 5/16 29/407.05 |
| 7,148,446 | B2 * | 12/2006 | Harnisch | B21D 28/10 219/121.67 |
| 7,154,530 | B2 * | 12/2006 | Andrews | B23Q 15/013 348/86 |
| 7,181,948 | B2 * | 2/2007 | Arns | C21D 1/673 72/185 |
| 7,354,365 | B2 * | 4/2008 | Kanehara | F16G 5/16 474/242 |
| 7,670,241 | B2 * | 3/2010 | Aoyama | F16G 5/16 474/242 |
| 8,253,064 | B2 * | 8/2012 | Beck | B23K 26/0876 219/121.67 |
| 8,294,061 | B2 * | 10/2012 | Schmauder | B23K 26/0093 219/121.67 |
| 8,471,175 | B2 * | 6/2013 | Finn | B23K 26/0838 219/121.67 |
| 9,539,669 | B2 * | 1/2017 | Stueckler | B23K 31/02 |
| 2004/0107757 | A1 * | 6/2004 | Arns | C21D 8/02 72/185 |
| 2004/0108305 | A1 * | 6/2004 | Harnisch | B21D 28/10 219/121.72 |
| 2005/0170926 | A1 * | 8/2005 | Aoyama | F16G 5/16 474/237 |
| 2005/0183487 | A1 * | 8/2005 | Andersson | B21D 35/00 72/350 |
| 2005/0187056 | A1 * | 8/2005 | Wang | F16G 5/16 474/242 |
| 2005/0247375 | A1 * | 11/2005 | Suzuki | C23C 8/02 148/217 |
| 2009/0003952 | A1 * | 1/2009 | Schmauder | B23K 26/02 409/183 |
| 2010/0016112 | A1 * | 1/2010 | Kobayashi | B29D 29/10 474/255 |
| 2010/0288010 | A1 * | 11/2010 | Suzuki | B21D 53/14 72/379.2 |
| 2015/0314395 | A1 * | 11/2015 | Stueckler | C22C 38/42 228/173.6 |
| 2016/0023368 | A1 * | 1/2016 | Dillon, Jr. | B26D 7/18 219/121.72 |
| 2016/0214162 | A1 * | 7/2016 | Alber | B23K 35/002 |

FOREIGN PATENT DOCUMENTS

| | | |
|---|---|---|
| EP | 0 113 813 A2 | 7/1984 |
| GB | 485 242 A | 5/1938 |
| WO | 2009/080870 A1 | 7/2009 |
| WO | 2014/089594 A1 | 6/2014 |

* cited by examiner

METHOD FOR PRODUCING CONTINUOUS METAL STRIPS OF ANY WIDTH

CROSS REFERENCE TO RELATED APPLICATIONS

This application is the National Stage of PCT/AT2017/060042 filed on Feb. 23, 2017, which claims priority under 35 U.S.C. § 119 of Austrian Application No. A 50125/2016 filed on Feb. 23, 2016, the disclosure of which is incorporated by reference. The international application under PCT article 21(2) was not published in English.

The invention relates to an endless metal belt having a length or circumference and a width which is produced by welding a number of individual metal belt parts. The invention further relates to a method for producing at least one endless metal belt which has a length or circumference and a width, whereby a number of individual metal belt parts made from at least one belt-shaped base material respectively base belt are welded to produce the at least one metal belt. Finally, the invention relates to a use of such a metal belt.

A metal belt and a production method of said type are basically known from the prior art. Usually in this context, a piece of a corresponding length is cut from a base belt and then welded to obtain an endless metal belt by means of a weld seam extending transversely to the metal belt. If the base belt is wider than the metal belt, a corresponding strip is cut from the base belt or metal belt. If the base belt is narrower, a number of base belts or metal belts are welded to one another along their longitudinal edges.

A disadvantage of this production method is that depending on the width of the available base material and the desired width of the finished metal belt, considerable quantities of waste offcuts can occur in some cases. For example, if the base belt is 2 m wide and the width of the finished metal belt should be 2.10 m for example, two base belts of the appropriate length have to be welded and a 1.90 m wide piece cut. It is clear from this example that under certain circumstances, almost 50% of the material used will be wasted. Particularly in the case of very expensive base material, for example a belt of high quality stainless steel, the known production method leads to high production costs. In actual fact, only multiples of the base belt width can be produced without creating waste.

Furthermore, if a number of base belts are welded along their longitudinal edges, there will be a crossover of weld seams when welding to produce an endless metal belt. These crossover points are very problematic insofar as they result in a pronounced change in the structure and also a weakening of the material.

On this subject, WO 2009/080870 A1 also discloses a method for producing a metal belt that is used in a paper, board or finishing machine. In the case of this method, the endless metal belt is made by welding a number of belt pieces side by side and/or in succession, for example using the TIG or MIG/MAG method. The grinding of the metal belt to its final thickness is carried out essentially only on the outer surface.

Accordingly, an objective of the invention is to specify an improved metal belt and an improved method for producing it. In particular, waste should be kept to a minimum and mutually crossing weld seams avoided.

The objective of the invention is achieved on the basis of a metal belt of the type outlined above whereby a rolling direction of the individual metal belt parts and the weld seams extend transversely to the length or transversely to the circumference of the metal belt.

The objective of the invention is also achieved on the basis of a production method of the type outlined above whereby a rolling direction of the individual metal belt parts or base belt and the weld seams are disposed transversely to the length or transversely to the circumference of the metal belt.

In this manner, belts of any width (and not just multiples of a base belt width) can be produced with virtually no waste. It is of advantage if all the weld seams extend transversely to the length/circumference of the metal belt. This enables mutually crossing weld seams and hence marked distortions in the structure of the metal belt and/or pronounced weak points to be totally avoided.

The endless metal belt of said type may be between 1 m and 200 m long, between 1 m and 10 m wide and between 0.3 mm and 2.5 mm thick in particular. In particular, the metal belt may be used in a belt press, on a vehicle test rig or in an oven. Use in the paper industry or pulp industry would also be conceivable, for example in a paper production machine or in a pulp production machine.

The at least one base belt, like the metal belt, may also have a length and a width, and the width in particular is shorter than the length. Accordingly, the rolling direction is oriented in the direction of the length of the base belt in particular and the length of the base belt is oriented transversely to the length/circumference of the metal belt in particular.

Other advantageous embodiments and features of the invention will be apparent from the dependent claims as well as from the description given with reference to the drawings.

It is of advantage if the weld seams extend at a right angle to the length/circumference of the metal belt. This results in very little waste when producing the metal belt.

However, it is also of advantage if the weld seams extend obliquely to the length/circumference of the metal belt. During operation, the metal belt is frequently tensed, in some instances with considerable tensile forces. Due to the proposed orientation of the weld seams, the tensile stress induced in them can be kept to a relatively low level. Furthermore, the tendency to cracking is reduced.

It is also of practical effect if a rolling direction extends parallel with the weld seams. As a result of this feature, there is likewise very little waste when producing the metal belt.

However, it is also of practical effect if a rolling direction extends obliquely to the weld seams. This enables the ability of the metal belt to withstand loads to be increased under certaro circumstances.

It is likewise of practical effect if a number of individual metal belt parts are cut from the at least one base belt which, in terms of their dimensions, respectively match the width of the metal belt and if these individual metal belt parts are then welded directly to produce the metal belt. In this manner, the metal belt can be produced without the extra step of producing an intermediate product.

However, it is also of advantage if a) a number of individual base belt parts are cut from the at least one base belt and these are welded to obtain an intermediate product or b) a number of base belts are welded directly and without a separating cut to obtain an intermediate product and if the intermediate product is separated transversely to the resulting weld seam or transversely to the resulting weld seams and the resulting individual intermediate product parts are welded to obtain the at least one metal belt.

Based on this variant of the method therefore, an intermediate product is produced by welding a number of base belts or a number of individual base belt parts along their longitudinal edges from which the metal belt is then produced. In this manner, relatively long weld seams can advantageously be produced which, as a rule, can be produced to a higher quality than is the case with many short weld seams. The end result is an endless metal belt produced to a particularly high quality. Said weld seams will be particularly long in the situation where the base belts are welded directly and without a separating cut to obtain an intermediate product (case b). Naturally, it would also be possible to cut a number of individual base belt parts from the at least one base belt and weld these to obtain an intermediate product (case a).

A separating cut can generally be made by shearing, plasma cutting, gas cutting, laser cutting, nibbling, etc.

It is also of practical effect if a number of individual intermediate product parts are welded to obtain a metal belt. As a result of this, the intermediate product does not need to be excessively wide.

However, it is also of practical effect if a single individual intermediate product part is welded to obtain a metal belt. This can be done by producing an intermediate product having a corresponding width. The metal belt can be produced on a particularly rational basis as a result.

It is also of particular advantage if the cutting of at least two individual metal belt parts and/or at least two individual base belt parts and/or at least two individual intermediate product parts takes place in one step or simultaneously. The metal belt can be produced on a particularly rational basis as a result. For example, two or more cutting heads are moved simultaneously along two or more cutting lines for this purpose.

It is also of advantage if cutting of an individual metal belt part and/or an individual base belt part and/or an individual intermediate product part is effected along a straight cutting line. This offers a particularly simple way of splitting the intermediate product comprising the base belt respectively a number of base belts.

However, it is also of practical effect if the metal belt is ground after the welding operation. This enables a flat belt surface with a virtually uniform appearance to be produced.

However, it is also of practical effect if the metal belt is polished after the grinding operation. An even higher quality surface can be produced in this manner.

Finally, it is also of practical effect if the metal belt is coated after the grinding or polishing operation. For example, the metal belt may be provided with a Teflon coating (coating of polytetrafluoroethylene, PTFE) or a coating of chromium. The metal belt may also be provided with an embossed structure or etched structure.

Figure 2:
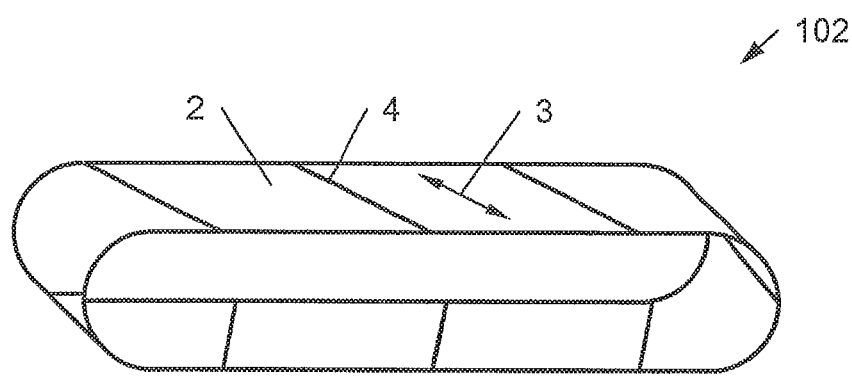
Figure 3:
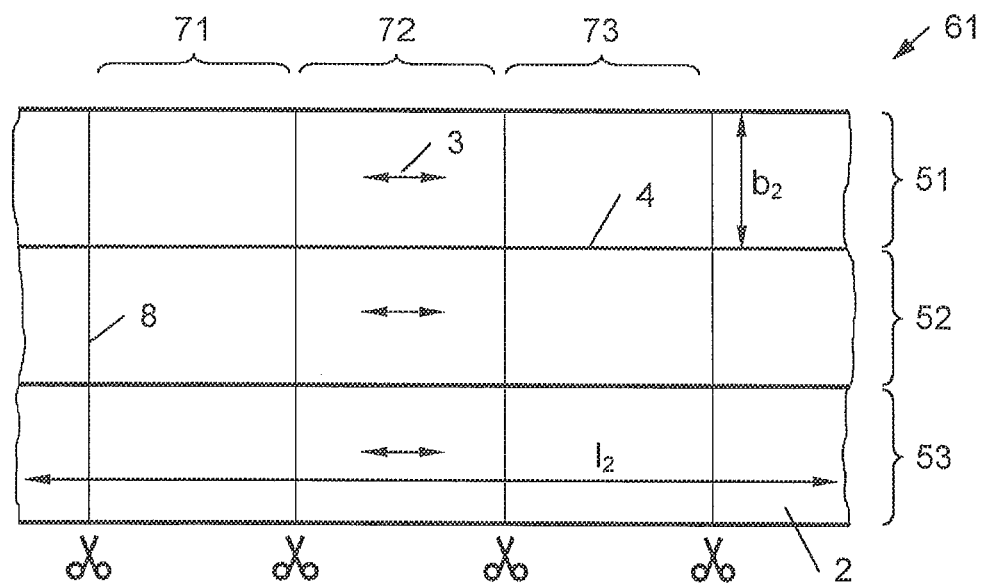
Figure 4:
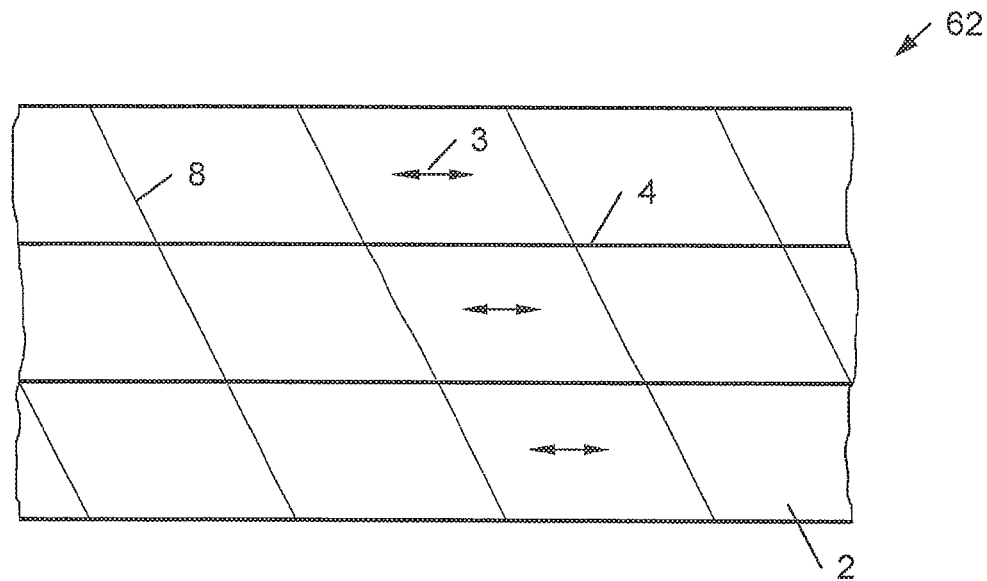

To provide a clearer understanding, the invention will be described in more detail with reference to the appended drawings. These illustrate:

FIG. 1 an example of an endless metal belt with weld seams extending at a right angle to its longitudinal edges, viewed from an angle;

FIG. 2 the same as FIG. 1 but with obliquely extending weld seams;

FIG. 3 an example of an intermediate product comprising a number of base belts welded to one another and cutting lines extending at a right angle to its longitudinal edges;

FIG. 4 the same as FIG. 3 but with obliquely extending cutting lines and

Figure 5:
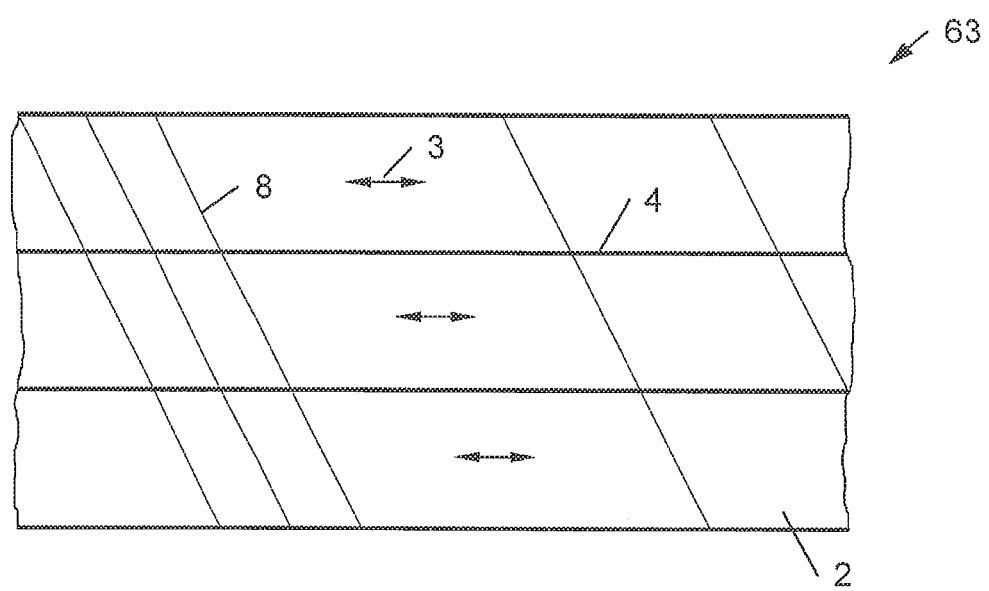

FIG. 5 the same as FIG. 4 but with individual intermediate product parts of differing widths.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Furthermore, individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIG. 1 illustrates a first example of an endless metal belt 101 which has a length $l_1$ (or circumference $l_1$) and a width $b_1$ and which is produced by welding a number of individual metal belt parts 2. A rolling direction 3 of the individual metal belt parts 2 and the weld seams 4 (in this instance even all the weld seams 4) extend transversely to the length $l_1$ of the metal belt 101. In the example illustrated, the width $b_1$ is smaller than the length $l_1$ or circumference $l_1$. However, this is not necessarily the case.

In the specifically illustrated example, the weld seams 4 extend at a right angle to the length/circumference $l_1$ of the metal belt 101. However, this is not an absolute condition. Instead, it is also conceivable for the weld seams 4 to extend obliquely to the length/circumference $l_1$ of the metal belt as is the case with the metal belt 102 illustrated in FIG. 2. In principle, it is also conceivable for the weld seams 4 to extend in different directions but the weld seams 4 do not cross one another.

In the examples illustrated, a rolling direction 3 extends parallel with the weld seams 4. Whilst this is of advantage, it is not absolutely necessary. Instead, it would also be conceivable for the rolling direction 3 to extend obliquely to the weld seams 4. In principle, it would also be conceivable for the rolling directions 3 to extend in different directions.

In general, the illustrated metal belts 101, 102 may be between 1 m and 200 m long, between 1 m and 10 m wide and between 0.3 mm and 2.5 mm thick. Furthermore, a use of the metal belts 101, 102 in a belt press, on a vehicle or aircraft test rig or in an oven would be conceivable in particular. Furthermore, use in the paper industry or pulp industry would be conceivable, for example in a paper production machine or in a pulp production machine.

Based on a method for producing at least one endless metal belt 101, 102 of said type, a number of base belts may be welded to obtain an intermediate product. FIG. 3 illustrates an example of this where three base belts 51 . . . 53 have been welded directly and without a separating cut to obtain an intermediate product 61. Each of the base belts 51 . . . 53 has a length $l_2$ and a width $b_2$ which is shorter than the length $l_2$ in the illustrated example. The rolling direction 3 is oriented respectively parallel with the length $l_2$ of the base belts 51 . . . 53.

In a subsequent processing step, the intermediate product 61 is separated transversely to the resulting weld seams 4 and the resulting individual intermediate product parts 71 . . . 73 are welded to obtain a metal belt 101, 102. In FIG.

3, scissor symbols indicate where the intermediate product 61 is separated along the cutting lines 8 which, in this specific example, are straight cutting lines 8 oriented perpendicular to the length $l_2$ of the base belts 51 . . . 53. Naturally, a cutting line 8 may also extend in an arc, for example. In general, all cutting methods may be considered, such as shearing, plasma cutting, gas cutting, laser cutting, nibbling, etc., for example.

In particular, welding of the base belts 51 . . . 53 along their longitudinal edges may be implemented such that the as yet non-welded base belts 51 . . . 53 are unreeled from a first reel or a number of first reels and the intermediate product 61 is reeled onto a second reel in the welded state. To this end, the first reels are not necessarily disposed coaxially but may also rotate about axes spaced at a distance apart from one another. The welding operation takes place simultaneously during reeling, unreeling in particular. The welding head may remain stationary as the forward movement is effected by the reeling/unreeling process. The process is then continuous. It would also be conceivable to unreel a piece of the base belts 51 . . . 53, halt the movement of the base belts 51 . . . 53, produce a piece of a weld seam 4 by moving a welding head, reel the welded part, move the welding head into the initial position and repeat the sequence recursively until the welding of the base belts 51 . . . 53 has been completed.

In general, a number of weld seams 4 may be produced simultaneously and thus welding of more than two base belts 51 . . . 53 may take place simultaneously. However, the weld seams 4 may also be produced consecutively. Finally, the weld seams 4 may also be produced partially in parallel and partially consecutively.

The same applies to welding of the individual metal belt parts 2 respectively the individual intermediate product parts 71 . . . 73. Here too, the weld seams 4 may be produced consecutively or a number of weld seams 4 are produced simultaneously. Furthermore, the metal belt 101, 102 may also be reeled onto a reel respectively unreeled from a reel.

As may be seen in FIG. 3, a rolling direction 3 is oriented in the length $l_2$ of the base belt 51 . . . 53 and the length $l_2$ of the base belt 51 . . . 53 is oriented transversely to the length/circumference $l_1$ of the metal belt 101, 102. Accordingly, a rolling direction 3 of the individual metal belt parts 2 and/or the base belts 51 . . . 53 and the weld seams 4 are oriented transversely to the length/circumference $l_1$ of the metal belt 101, 102.

Based on one variant of the method, a number of individual intermediate product parts 71 . . . 73 are welded to obtain a metal belt 101, 102. However, if the total width of the intermediate product 61 . . . 63 is sufficient, it would also be conceivable for a single individual intermediate product part 71 . . . 73 to be welded to obtain a metal belt 101, 102.

In FIG. 3, the cutting lines 8 extend at a right angle to the weld seams 4, rolling direction 3 and length $l_2$ of the base belts 51 . . . 53. However, it would also be conceivable for the cutting lines 8 to extend obliquely to the weld seams 4, rolling direction 3 and length $l_2$ of the base belts 51 . . . 53, as illustrated in FIG. 4. Furthermore, it is also conceivable to produce individual intermediate product parts 71 . . . 73 of differing widths from the intermediate product as is the case with the intermediate product 63 illustrated in FIG. 5.

In the previous examples, it is assumed that the base belts 51 . . . 53 are welded directly and without a separating cut to obtain an intermediate product 61 . . . 63. However, this is not an absolutely necessary condition. It would also be conceivable for a number of individual base belt parts to be cut from the at least one base belt 51 . . . 53 and then welded to obtain an intermediate product 61 . . . 63.

It would also be conceivable for a number of individual metal belt parts 2 to be cut from the at least one base belt 51 . . . 53 which respectively match the width $b_1$ of the metal belt 101, 102 in terms of their dimensions and these individual metal belt parts 2 are then welded directly, i.e. without an intermediate product 61 . . . 63, to obtain the metal belt 101, 102.

In general, the cutting of at least two individual metal belt parts 2 and/or at least two individual base belt parts and/or at least two individual intermediate product parts 71 . . . 73 may take place in one step or simultaneously, for example by moving two laser cutting heads simultaneously along two different cutting lines 8.

After the welding operation, the metal belts 101, 102 may be ground and after the grinding operation polished. After the grinding or polishing operation, the metal belts 101, 102 may also be coated. For example, the metal belts 101, 102 may be provided with a Teflon coating or a coating of chromium. Furthermore, the metal belts 101, 102 may be provided with an embossed structure or etched structure.

The embodiments illustrated as examples represent possible variants of metal belts 101, 102 proposed by the invention and intermediate products 61 . . . 63 used for them, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

The protective scope is defined by the claims. However, the description and drawings may be used as a reference for interpreting the claims. Individual features or combinations of features from the different embodiments illustrated and described may be construed as independent inventive solutions or solutions proposed by the invention in their own right. The objective underlying the independent inventive solutions may be found in the description.

In particular, it should also be noted that the illustrated metal belts 101, 102 and intermediate products 61 . . . 63 may in reality also comprise more or fewer parts than illustrated and that the drawings are highly simplified representations in some instances.

For the sake of good order, finally, it should be pointed out that, in order to provide a clearer understanding of its structure, the device and its constituent parts are illustrated to a certain extent out of scale and/or on an enlarged scale and/or on a reduced scale.

LIST OF REFERENCE NUMBERS 101, 102 Endless metal belt
2 Individual metal belt part
3 Rolling direction
4 Weld seam
51 . . . 53 Base belt
61 . . . 63 Intermediate product
71 . . . 73 Individual intermediate product part
8 Cutting line
$b_1$ Width of metal belt
$b_2$ Width of base belt
$l_1$ Length/circumference of metal belt
$l_2$ Length of base belt

The invention claimed is:

1. A method for producing at least one endless metal belt (101, 102) which has a length/circumference ($l_1$) of between 1 m and 200 m, a width ($b_1$) of between 1 m and 10 m and a thickness of between 0.3 mm and 2.5 mm, whereby a number of individual metal belt parts (2) made from at least one belt-shaped base material or base belt (51 . . . 53) are welded to obtain the metal belt (101, 102), wherein a rolling direction (3) of the individual metal belt parts (2) and/or base belts (51 . . . 53) and all the weld seams (4) are oriented transversely to the length/circumference ($l_1$) of the metal belt (101, 102), and the rolling direction (3) extends parallel with the weld seams (4).

2. The method according to claim 1, wherein the at least one base belt (51 . . . 53) also has a length ($l_2$) and a width ($b_2$) and the rolling direction (3) is oriented in the direction of the length ($l_2$) of the base belt (51 . . . 53) and the length ($l_2$) of the base belt (51 . . . 53) is oriented transversely to the length/circumference ($l_1$) of the metal belt (101, 102).

3. The method according to claim 1, wherein a number of individual metal belt parts (2) are cut from the at least one base belt (51 . . . 53) which, in terms of their dimensions, respectively match the width ($b_1$) of the metal belt (101, 102) and these individual metal belt parts (2) are then welded directly to obtain the metal belt (101, 102).

4. The method according to claim 1, wherein
a) a number of individual base belt parts are cut from the at least one base belt (51 . . . 53) and these are welded to obtain an intermediate product (61 . . . 63) or b) a number of base belts (51 . . . 53) are welded directly and without a separating cut to obtain an intermediate product (61 . . . 63) and the intermediate product (61 . . . 63) is separated transversely to the resulting weld seam (4) or transversely to the resulting weld seams (4) and the resulting individual intermediate product parts (71 . . . 73) are welded to obtain the at least one metal belt (101, 102).

5. The method according to claim 4, wherein a number of individual intermediate product parts (71 . . . 73) are welded to obtain a metal belt (101, 102).

6. The method according to claim 4, wherein a single individual intermediate product part (71 . . . 73) is welded to obtain a metal belt (101, 102).

7. The method according to claim 1, wherein the cutting of at least two individual metal belt parts (2) and/or at least two individual base belt parts and/or at least two individual intermediate product parts (71 . . . 73) takes place in one step/simultaneously.

8. The method according to claim 1, wherein cutting of an individual metal belt part (2) or an individual base belt part or an individual intermediate product part (71 . . . 73) is effected along a straight cutting line (8).

9. The method according to claim 1, wherein the metal belt (101, 102) is ground after the welding operation.

10. The method according to claim 9, wherein the metal belt (101, 102) is polished after the grinding operation.

11. The method according to claim 9, wherein the metal belt (101, 102) is coated after the grinding or polishing operation.

12. The method according to claim 1, wherein the weld seams (4) extend at a right angle to the length/circumference ($l_1$) of the metal belt (101, 102).

13. The method according to claim 1, wherein the weld seams (4) extend obliquely to the length/circumference ($l_1$) of the metal belt (101, 102).

* * * * *